May 30, 1950         L. H. WORKMAN         2,509,384
ADJUSTABLE HANGER BRACKET
Filed May 2, 1947
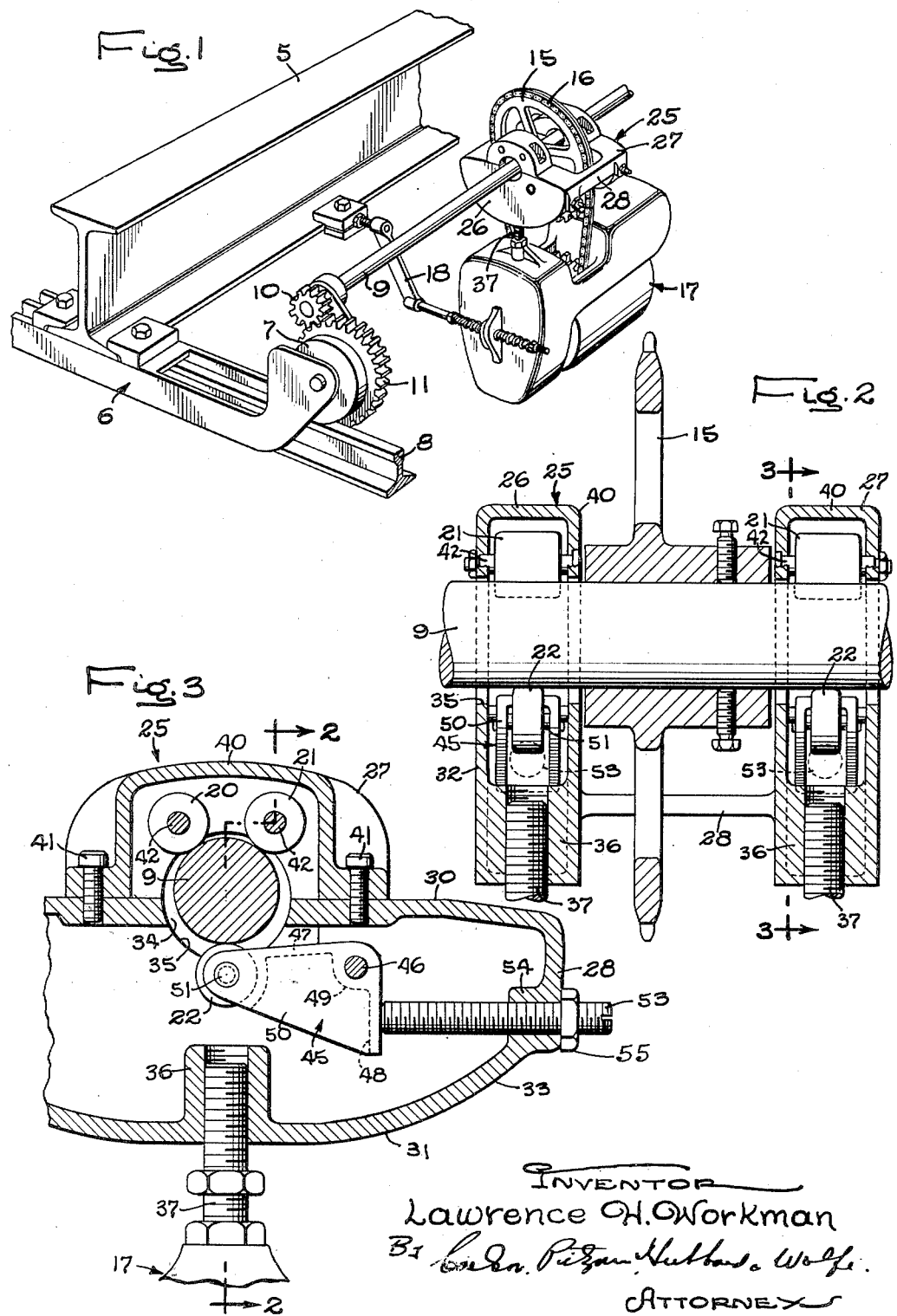
INVENTOR
Lawrence H. Workman Patented May 30, 1950

2,509,384

UNITED STATES PATENT OFFICE 2,509,384

ADJUSTABLE HANGER BRACKET

Lawrence H. Workman, Muskegon, Mich., assignor to Manning, Maxwell & Moore, Inc., Muskegon, Mich., a corporation of New Jersey Application May 2, 1947, Serial No. 745,385

6 Claims. (Cl. 105—163)

The invention relates to an improved hanger bracket for supporting a power actuated driving unit on the traverse drive shaft of a bridge crane.

While not limited to such use, the improved hanger bracket is particularly adapted for supporting a power operated driving unit of the type utilized for converting hand driven bridge cranes for power operation. In installing such units, the hand chain wheel commonly provided on the cross shaft of the crane is replaced by a sprocket wheel and the unit is drivingly connected therewith by a suitable chain. To avoid the necessity of drilling or otherwise machining the crane bridge and to permit the use of a standard length of chain in all installations, it is customary to support the driving unit directly upon the cross shaft of the crane. As the cross shafts of different cranes vary in diameter, it has been necessary heretofore either to provide special bushings for each installation or to supply with each unit a separate set of bushings for each size of shaft likely to be met with in different installations. This complicates the installation and increases the cost substantially.

One object of the invention is to avoid the above difficulties by providing a power unit hanger bracket having improved shaft engaging bearings which are readily adjustable for use with shafts of different diameters.

Another object is to provide a hanger bracket that can be mounted on the cross shaft of a bridge crane or removed therefrom while the shaft remains connected with the driving wheels of the crane.

A further object is to provide a hanger bracket that imposes a minimum of frictional resistance on the shaft upon which it is supported.

Other objects and advantages of the invention will become apparent from the following detailed description of the preferred embodiment illustrated in the accompanying drawing, in which:

Figure 1 is a perspective view showing a hanger bracket embodying the features of the invention as installed in a bridge crane.

Fig. 2 is a sectional view of the hanger bracket taken longitudinally of the shaft upon which it is mounted in offset vertical planes substantially on the line 2—2 of Fig. 3.

Fig. 3 is a transverse sectional view of the hanger bracket taken in a vertical plane substantially on the line 3—3 of Fig. 2.

While the invention is susceptible of various modifications and alternative constructions, I have shown in the drawings and will herein describe in detail the preferred embodiment, but it is to be understood that I do not thereby intend to limit the invention to the specific form disclosed, but intend to cover all modifications and alternative constructions falling within the spirit and scope of the invention as expressed in the appended claims.

For purposes of illustration, the invention has been shown as installed in a traveling bridge crane having a bridge member 5 in the form of an I beam supported at opposite ends by trucks 6, one of which is shown in the drawing. The trucks are suitably attached to the ends of the beam 5 and each is provided with a pair of flanged wheels, including a driving wheel 7 adapted to run on an elevated track formed by rails 8. A traverse shaft 9 extending parallel to the bridge member 5 between the two trucks 6 and suitably journaled thereon is operatively connected with each driving wheel 7 by means of a pinion 10 keyed to the shaft and meshing with a gear 11 rigid with the truck wheel.

Bridge cranes of the above type are commonly arranged for manual traverse by means of a hand chain running over a sprocket wheel fixed on the shaft 9. When converted for power traverse, the hand chain wheel is replaced by a sprocket wheel 15 and a roller chain 16 operatively connects the sprocket wheel with the driving pinion of a power unit 17. The power units may be of any preferred type, such as that disclosed in the Mitchell Patent No. 2,406,889, granted September 3, 1946. An anchoring bar 18 connected between the drive unit and the bridge member 5 prevents the unit from rotating relative to the shaft 9.

In accordance with the invention, the driving unit is supported on the shaft 9, in this instance in suspended relation, by a hanger bracket having two sets of bearing elements spaced apart longitudinally of the shaft 9, each comprising three elements 20, 21 and 22 positioned to engage the shaft at three circumferentially spaced points. Two of the bearing elements, as for example the elements 20 and 21, are supported in fixed positions, while the third element 22 is supported for adjustment toward or from the companion elements to conform to the diameter of the particular shaft with which the hanger is associated. The hanger bracket may therefore be installed in cranes having drive shafts of different diameters without requiring the use of auxiliary apparatus such as bushings.

The bearing elements 20, 21 and 22 are mounted on a rigid frame 25, herein shown as comprising a pair of end sections 26 and 27 spaced apart sufficiently to enable them to straddle the hub of the sprocket wheel 15 and connected together at opposite sides by cross members 28. The cross members 28 are spaced apart laterally to provide ample clearance for the sprocket wheel and chain 16 coacting therewith. The frame 25 may be conveniently constructed as a unitary casting with the cross members 28 integral with the end sections 26 and 27.

In the exemplary hanger bracket the end sections 26 and 27 of the frame are generally semicylindrical in cross-section, each having a flat top wall 30, a concave bottom wall 31 and upright side walls 32 defining a hollow chamber or housing 33 for the bearing element 22 and its adjustable support. The top wall 30 is slotted transversely as at 34 and the side walls 32 are formed with arcuate notches 35 registering with the slot 34 to afford clearance for the shaft 9. A tubular boss 36 integral with the bottom wall 31 of each end section is threaded for the reception of a hanger stud 37 by which the driving unit 17 is secured to the frame of the hanger bracket, the stud having right and left hand threads at opposite ends to facilitate adjustment of the unit toward or from the bracket.

To permit the hanger bracket to be mounted on the shaft without requiring removal of the shaft from the crane, the bearing elements 20 and 21 are carried by and enclosed in a hollow generally U-shaped cap member 40 adapted to be removably secured to the top walls of the end sections 26 and 27, as by screws 41. The bearing elements are preferably in the form of rollers and are supported with their axes parallel to the axis of the shaft 9 by removable pins 42 seated in the side walls of the cap members.

The bearing elements 22 also comprise rollers and to provide for their adjustment relative to the companion bearing elements, each roller 22 is mounted on a movable support. In the exemplary structure the movable support comprises a lever member 45 supported on the side walls 32 of an end frame section by a pin 46 for pivotal movement about an axis parallel to and spaced laterally from the axis of the shaft 9. As herein shown, the lever member 45 comprises a pair of arms 47 and 48 disposed substantially at right angles to each other and having at their apex a hub portion 49 apertured to receive the pivot pin 46. Side plates 50 integral with the arms 47 and 48 are extended beyond the end of the arm 47 to carry a pin 51 upon which the roller 22 is journalled. The lever member 46 is so dimensioned that the roller 22 is pressed against the underside of the shaft 9 at a point lying in a plane approximately midway between the points of contact of the rollers 20 and 21 with the shaft.

For regulating the position of the roller 22 relative to the companion rollers 20 and 21, an adjusting screw 53 is threaded through a boss 54 integral with the bottom wall 31 of each end frame section with its inner end bearing against the arm 48 of the associated lever member 45. Accordingly, by turning the adjusting screw in or out, the roller 22 may be shifted toward or from the companion rollers to engage the shaft in opposed relation to the rollers 20 and 21. A three-point bearing on the shaft is thus provided which effectually maintains the bracket in position on the shaft, while affording a minimum of resistance to the turning of the same. A lock nut 55 threaded on the adjusting screw serves to retain the parts in adjusted position.

In order to mount the hanger bracket on a shaft, the cap members 40 are removed and the rollers 22 are retracted by backing off their adjusting screws 53. The hanger frame 25 is then brought into position with the end sections 26 and 27 straddling the sprocket wheel hub and the shaft 9 disposed in the channel formed by the slots 34 and notches 35. The cap members 40 are then replaced on the end sections of the frame and secured thereto by means of the screws 41. The weight of the hanger bracket and the driving unit is now transferred to the rollers 20 and 21 and, with the bracket thus supported, the adjusting screws 53 are screwed in until the rollers 22 engage the shaft to hold the bracket firmly in place thereon.

It will be apparent from the foregoing that the invention provides a hanger bracket of novel and advantageous construction for supporting stationary apparatus on a rotatable shaft. Through the provision of adjustable shaft-engaging bearings, the improved bracket may be mounted on shafts of different diameters without the use of bushings, such as have been required heretofore. Moreover, the bearings while firmly retaining the bracket on the shaft and effectually preventing relative lateral movements of the bracket thereon, offer a minimum of frictional resistance to the rotation of the shaft. The improved bracket may be installed on the drive shaft of a bridge crane very quickly and with a minimum of labor, since such installations may be effected without disconnecting the shaft from the drive wheels of the crane.

I claim as my invention:

1. A hanger bracket for supporting a power actuated driving unit on the traverse shaft of a bridge crane comprising, in combination, a frame, two sets of bearings mounted on said frame, each bearing set including three bearing elements positioned to engage the shaft at circumferentially spaced points with two bearing elements operative to support the weight of the bracket and its load, and means for shifting the other of said bearing elements toward or from the companion bearing elements to adjust the hanger for shafts of different diameters.

2. A hanger bracket for supporting a power operated driving unit on the traverse shaft of a bridge crane comprising, in combination, a frame, two sets of bearings mounted on said frame, each bearing set including three bearing elements positioned to engage the shaft at circumferentially spaced points, one of said bearing elements being adjustable toward and from the other two elements to accommodate shafts of different diameters, and means supporting said other two bearing elements for removal from the frame as a unit to facilitate the mounting of the hanger on the shaft.

3. A hanger bracket for supporting a power operated driving unit on the traverse shaft of a bridge crane comprising, in combination, a frame, two sets of bearings mounted on said frame, each bearing set including three bearing elements positioned to engage the shaft at circumferentially spaced points with two of the elements operative to support the bracket and its load, the other of said bearing elements being shiftable relative to said two bearing elements to accommodate shafts of different diameters, and an adjusting screw for shifting said one bearing element.

4. A power unit hanger bracket for a bridge crane having a rotatable traverse shaft, said bracket comprising, in combination, an elongated frame having end sections spaced apart and rigidly connected together, each of said end sections having a transverse slot in its upper face for the accommodation of the traverse shaft, cap members removably secured to said end sections in bridging relation to the slots therein, a pair of rollers journaled in each cap member and spaced apart to engage the traverse shaft at circumferentially spaced points, and a roller bearing supported in each end section of the frame for movement toward or from the bearing elements carried by the associated cap members.

5. A power unit hanger bracket for a bridge crane having a rotatable shaft, said bracket comprising, in combination, an elongated frame, a set of shaft-engaging bearings at each end of the frame, each of said sets comprising three rollers, means supporting two rollers of the set in fixed spaced relation to engage the shaft at circumferentially spaced points to carry the weight of the bracket and its load, a pivoted support for the other roller, and an adjusting screw operable to rock said support about its pivot to shift said other roller toward or from the companion rollers to conform to the diameter of the shaft.

6. A power unit hanger bracket for a bridge crane having a rotatable shaft, said bracket comprising, in combination, an elongated frame having end sections spaced apart and rigidly connected together, each of said end sections having a transverse slot in its upper face for the accommodation of the shaft, cap members removably secured to said end sections in bridging relation to the slots therein, a pair of rollers journaled in each cap member and spaced apart to engage the shaft at circumferentially spaced points, a lever member pivotally supported in each end section of the frame, a roller journaled on each lever member, and adjusting screws threaded into said end sections and cooperating with said lever members for shifting the rollers carried thereby toward or from the rollers carried by the respective cap members.

LAWRENCE H. WORKMAN.

REFERENCES CITED

The following references are of record in the file of this patent:

UNITED STATES PATENTS

| Number | Name | Date |
|---|---|---|
| 1,753,691 | Burns | Apr. 8, 1930 |
| 2,406,889 | Mitchell | Sept. 3, 1946 |